Figure 1:
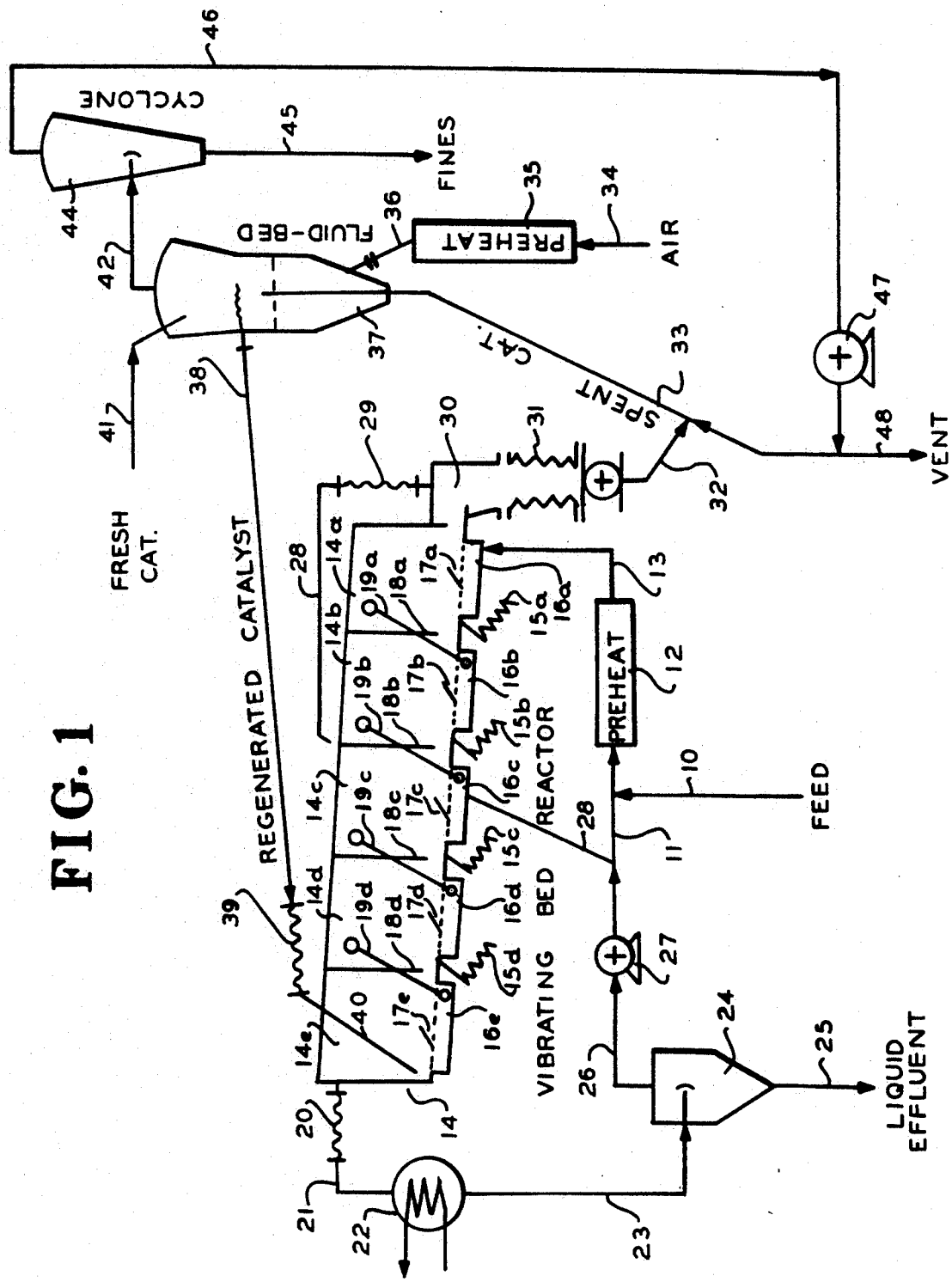

United States Patent [19]

Ember

[11] Patent Number: 5,245,093
[45] Date of Patent: Sep. 14, 1993

[54] REACTION PROCESSES IN A MULTI-STAGE FLUIDIZED BED

[75] Inventor: George Ember, Hackensack, N.J.

[73] Assignee: ABB Lummus Crest Inc., Bloomfield, N.J.

[21] Appl. No.: 301,876

[22] Filed: Jan. 26, 1989

[51] Int. Cl.$^5$ .................... C07C 5/10; C08G 85/00; B01J 8/18; B01J 2/34

[52] U.S. Cl. .................... 585/266; 422/127; 422/134; 422/142; 422/147; 502/41; 502/43; 526/65; 549/249; 549/258; 549/262; 549/523; 562/545; 564/305; 568/449; 568/716; 568/895; 568/910

[58] Field of Search .............. 208/108, 164, 156, 158; 502/43, 48, 56; 34/164; 422/127, 145, 142; 526/65; 585/265, 266

[56] References Cited

U.S. PATENT DOCUMENTS

| | | | |
|---|---|---|---|
| 1,932,364 | 10/1933 | Martin | 34/164 |
| 2,419,245 | 4/1947 | Arveson | 502/43 |
| 2,498,405 | 2/1950 | Fader | 422/127 |
| 3,281,395 | 10/1966 | Fukita et al. | 422/127 |
| 3,368,875 | 2/1968 | Tulleners | 208/108 |
| 3,582,288 | 6/1971 | Taylor et al. | 422/145 |
| 3,915,890 | 10/1975 | Soldate | 502/56 |
| 4,035,151 | 7/1977 | Czerny et al. | 34/164 |
| 4,399,350 | 8/1983 | Schneider et al. | 34/164 |
| 4,551,437 | 11/1985 | Berreri | 502/48 |
| 4,576,924 | 3/1986 | Koch et al. | 502/56 |

OTHER PUBLICATIONS

Benku Thomas, Vibrated Beds: New Tools for Heat Transfer Jun. 1988, pp. 65-75.
B. Biscans, Continuous equipment for ion exchange in a fluided bed, Apr. 1988, vol. 28, No. 2, pp. 248-256.
Professor Dr. Eng. Ryozo Toei, Multi-Stage Fluidised Bed Apparatus with Perforated Plates, 1968, pp. 34-42.
L. G. Svintsova, Use of a Gradientless Reactor With a Vibrating Suspended Catalyst Bed to Detect Radical--Chain, 1973, pp. 953-956.

Primary Examiner—Paul E. Konopka
Attorney, Agent, or Firm—Elliot M. Olstein; Raymond J. Lillie

[57] ABSTRACT

A process for reacting a fluid phase (gaseous and/or liquid phase) in contact with a solid phase in a reaction zone, wherein the improvement in said process comprises reacting the fluid phase in contact with the solid phase in a horizontally-oriented fluidized bed vessel. The vessel includes at least two compartments or stages, and includes means for vibrating the vessel. The process of the present invention enables one to effect fluidization of the solid phase independently of the flow rate or velocity of the fluid phase, thus enabling proper contact time of the fluid phase with the solid phase and minimizing the amount of fluid phase reactant to be recycled.

5 Claims, 3 Drawing Sheets

REACTION PROCESSES IN A MULTI-STAGE FLUIDIZED BED

This invention relates to a fluidized bed vessel, and the use thereof for contacting a fluid phase with a solid phase in said vessel.

This invention further relates to a new and improved process for effecting a reaction in a fluidized bed vessel.

More particularly, this invention relates to effecting a reaction in a fluidized bed vessel by providing a multi-stage vibrating fluidized bed, whereby the fluidization of the solid phase is independent of the flow of the fluid phase through the vessel.

Reactions in which a fluid phase, a gaseous (vapor) or liquid phase, is contacted with a solid phase, said solid phase being a solid reactant or a catalyst, are usually carried out either in fixed bed or fluidized bed reactors. The use of a fixed bed reactor, however, requires periodic shutdowns of the reactor in order to regenerate or reactivate the catalyst, or duplication of the reactor, both of which result in increased costs. Moving bed reactors, designed to solve the problem of shutting down the reactor in order to regenerate the catalyst, presented a costly solids handling problem connected with the continuous removal of inactive catalyst from the reactor.

The use of a fluidized bed reactor of the circulating catalyst type integrates truly continuous fluidized bed reaction and catalyst regeneration steps. In addition, high heat and mass transfer rates eliminate so-called "hot spots" (by minimizing the temperature gradients) in the fluid bed reactor. The close control of the reaction temperature improves the selectivity of highly exothermic reactions having an unstable product or intermediate.

The fluidized bed reactor, however, requires a high velocity of a fluid phase (e.g., gaseous and/or vapor phase) reactant in order to fluidize the solids (e.g., catalyst) in the bed. The high velocity of the fluid phase limits the residence time of the fluid phase reactant in the catalyst bed. The short residence time of the fluid phase reactant lessens the chances of reaction of the fluid phase reactant in its entirety and increases the need for the recycle of the reactant or reactants.

In accordance with an aspect of the present invention, there is provided an improvement in a process for reacting a fluid phase in contact with a solid phase in a reaction zone. The improvement comprises reacting the fluid phase in contact with the solid phase in a horizontally oriented fluidized bed vessel. The fluidized bed vessel includes at least two compartments defined by partition means allowing for solids flow between said at least two compartments. The fluidized bed vessel includes means for vibrating the fluidized bed vessel. The solids of the solid phase are passed from one compartment to another during said reaction of the fluid phase in contact with the solid phase. The fluid phase may move countercurrently to the direction of movement of the solids, or the fluid phase may move cocurrently with the direction of movement of the solids or the fluid phase in each compartment may not flow to another compartment; i.e., separate fluid inlets and outlets for each compartment. When the reactor has separate fluid inlets and outlets for each compartment, there may be provided cross-current movement of the fluid phase in relation to the direction of movement of solids. In each compartment, the flow of the fluid phase may be through the solid phase; i.e., the fluid phase moves transverse to the movement of the solid phase. In cases where the fluid phase flows from one compartment to another, the flow of the fluid phase may be cocurrent or countercurrent to the direction of movement of the solid phase.

The fluid phase may be in a vapor phase and/or a liquid phase. The solid phase may be comprised of a catalyst. The catalyst may be selected from the class comprising aluminosilicate catalysts, such as zeolite catalysts, phosphoric acid, and molybdenate-vanadium catalysts.

In one embodiment, each of the at least two compartments includes an inlet means and an outlet means, and wherein the fluid phase is introduced into at least two of said inlet means, and effluent is withdrawn and recovered from at least two of said outlet means.

The process may further comprise withdrawing at least a portion of the solids from the vessel after passage of the solids through the at least two compartments, regenerating the solids in a regeneration zone, and recycling the solids to the vessel for passage through the at least two compartments. The regeneration zone may comprise a fluidized bed reactor, wherein fluidization of the solids and regeneration of the solids is accomplished by passage of a heated gas through the fluidized bed reactor.

In a preferred embodiment, at least the solid phase moves in substantially plug flow. The fluid phase may also move in plug flow and plug flow of the fluid phase through the vessel may be cocurrent or countercurrent to the movement of the solid phase.

In accordance with another aspect of the present invention, a fluid phase reactant or reactants in the form of a vapor is polymerized in the presence of a solid phase catalyst in the fluidized bed vessel. Examples of such polymerizations include the formation of polyethylene from ethylene, the formation of polypropylene from propylene, and the copolymerization of polyethylene with polypropylene or polybutylene. As the polymerization or copolymerization reaction progresses (i.e., increase in length and molecular weight of polymer chain), a solid phase polymer is formed, which is deposited with the solid catalyst in the fluidized beds of the vessel, and the solid polymer moves from compartment to compartment with the catalyst. Because in such polymerizations only a small amount of catalyst is required one can withdraw the polymer from the vessel along with the catalyst, and catalyst regeneration is not necessary. Such polymerization reactions may be carried out at a temperature of from about 60° C. to about 100° C., preferably from about 70° C. to about 80° C., and at a pressure of about 300 psig.

The fluidized bed vessel, in another aspect of the present invention, may be used for fluid phase reactions in the presence of a catalyst wherein a vapor phase and/or liquid phase reactant is reacted in the presence of a solid catalyst to form a vapor phase and/or liquid phase product.

Such reactions include those that are exothermic, such as hydrogenations, oxidation reactions, chlorinations, ammonolyses and ammoxidation, oxidation, and vapor phase nitrations; for example, the production of maleic anhydride from n-butane, 1, 3-butadiene, or $C_4$ to $C_{10}$ hydrocarbons.

Specific examples of these reactions include the production of ethylene oxide, from ethylene, and propylene oxide from propylene, either of which may take place at about 250° C. and at about 15 psig. Isobutane may be oxidized to produce tertbutyl alcohol, or isobutylene may be oxidized to produce methacrylic acid, at a temperature of about 300° C. and a pressure of about 20 psig. O-xylene may be converted to phthalic anhydride, at a temperature of about about 380° C. to about 420° C., and at a pressure of about 15 psig. Ethylene may be reacted to form acetaldehyde at a temperature of about 140° C. and a pressure of about 15 psig. Acrolein and/or acrylonitrile may be produced from propylene at a temperature of about 450° C. and a pressure of about 15 psig. Nitrobenzene may be reacted to form aniline at a temperature of from about 250° C. to about 350° C., and at a pressure of about 15 psig.

Other reactions include the alkylation of phenols with methanol to produce cresols, xylenols, or trimethyl phenols. These reactions may be carried out at about 360° C., and a pressure of about 30 psig. Ethylene and $H_2O$ may be reacted to form ethanol at a temperature of from about 200° C. to about 300° C., and a pressure of about 15 psig, whereas tert-butyl alcohol may be dehydrated to produce isobutylene at a temperature of from about 200° C. to about 300° C., and a pressure of about 15 psig. Hydrogenation reactions include the hydrogenation of benzene to form cyclohexane at a temperature of from about 150° C. to about 250° C., and at a pressure of about 300 psig. In addition, aromatic nitriles may be produced from alkyl aromatics such as phthalonitrile from xylenes, nicotinonitriles from alkyl pyridines, etc.

Figure 2:
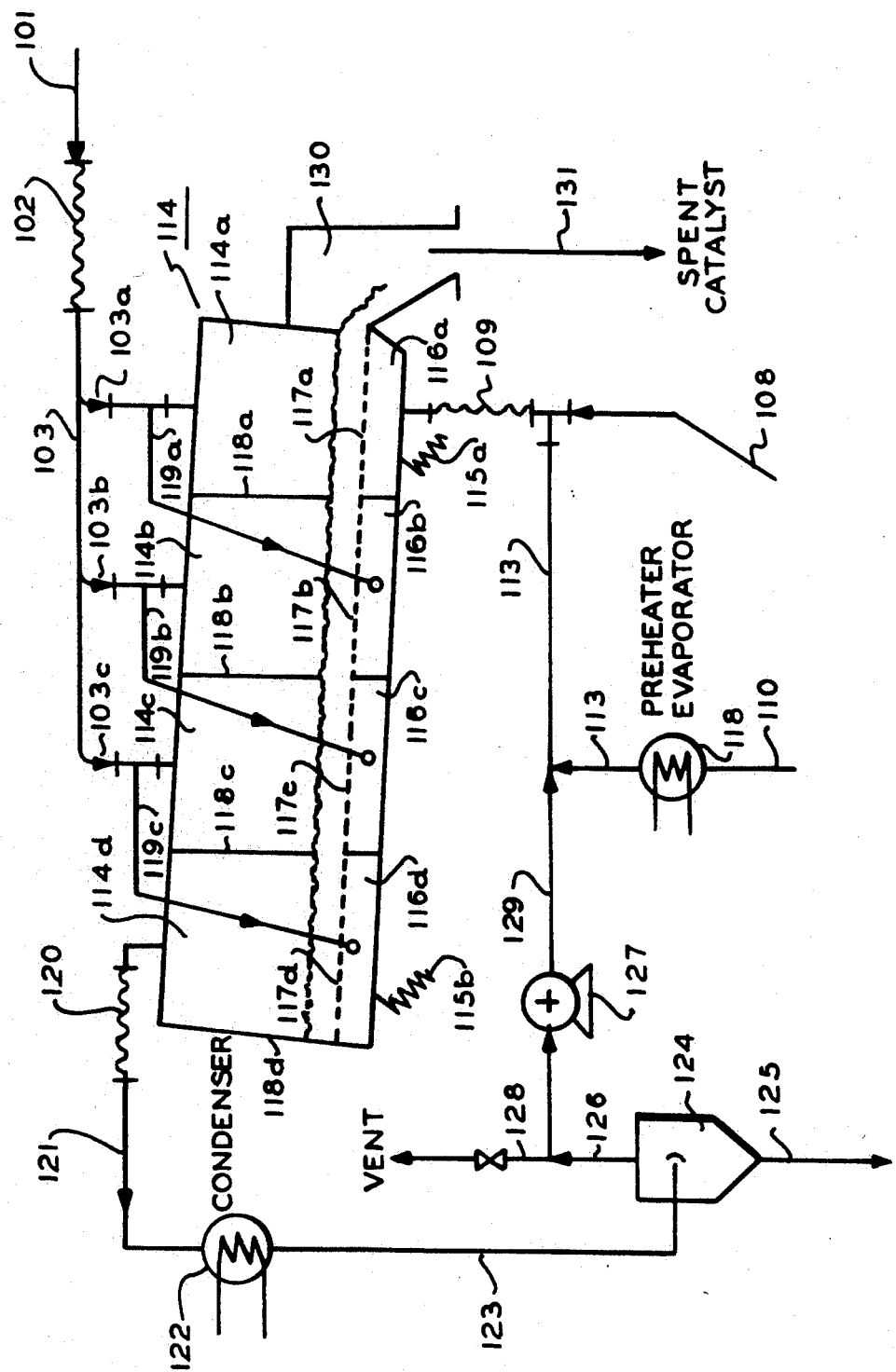
Figure 3:
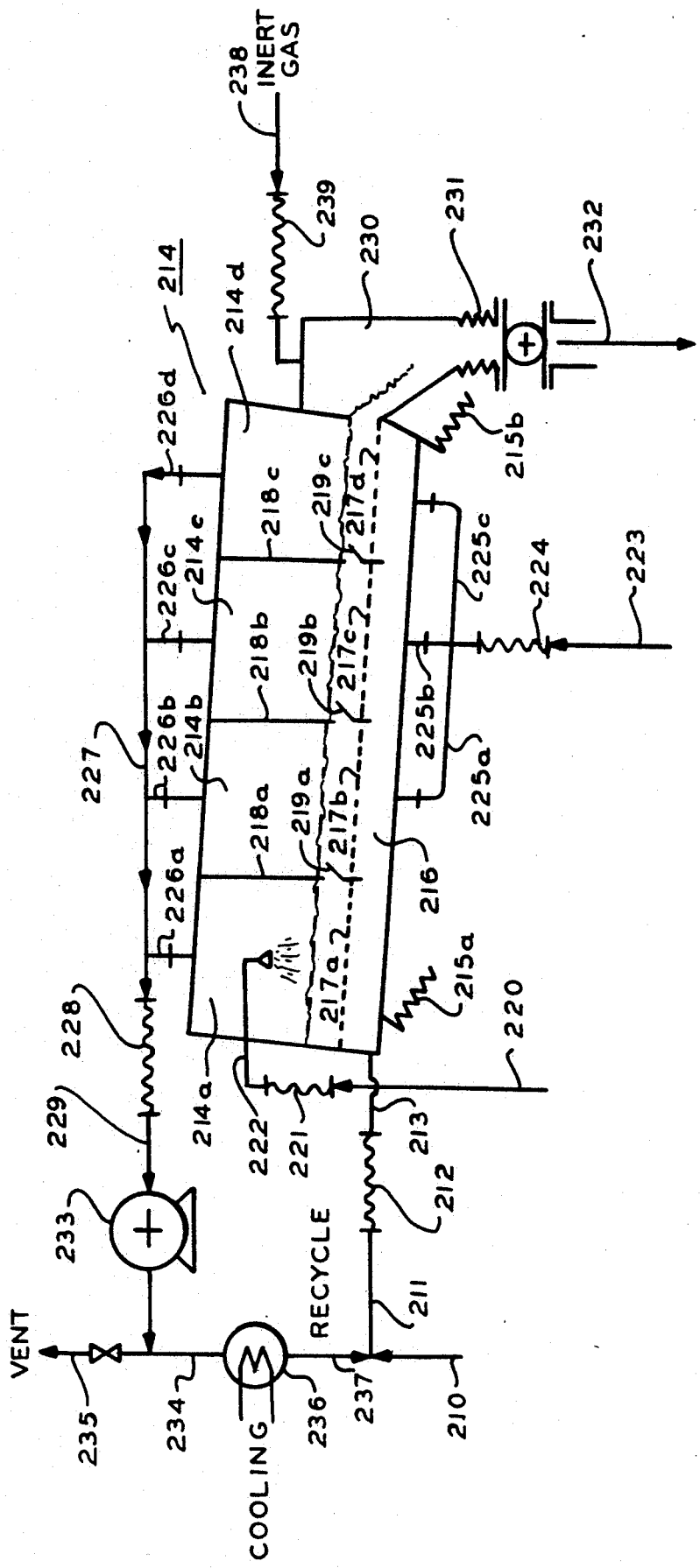

The invention will now be described with respect to the drawings, wherein:

FIG. 1 is a schematic of a first embodiment within the scope of the,, present invention wherein a multi-stage vibrating fluidized bed reactor is employed in a reaction of a fluid phase reactant in the presence of a solid phase catalyst to produce a fluid phase product:

FIG. 2 is a schematic of a second embodiment within the scope of the present invention depicting an oxidation reaction wherein oxygen is added through inlet means to each stage of the multi-stage vibrating fluidized bed: and FIG. 3 is a schematic of a third embodiment within the scope of the present invention wherein a multi-stage vibrating fluidized bed reactor is employed in a copolymerization of fluid phase monomers to produce a solid phase polymer product.

Referring now to the drawings as shown in FIG. 1, a feedstock in line 10 is passed to line 11, and then heated in preheater 12. In the embodiment shown in FIG. 1, the feedstock is one to be employed in an exothermic reaction as described above, wherein a fluid phase reactant, preferably a vapor phase reactant, is reacted in the presence of a solid catalyst to form a fluid phase, preferably a vapor phase, product. Examples of such reactions are hereinabove described. The feed which is preheated in preheater 12 comprises one or more reactants. The preheater is operated at temperature and pressure conditions well known in the art, said conditions depending upon the feed employed. After being heated, the feed is withdrawn from preheater 12 through line 13 and passed to distributor 16a of stage 14a of horizontally oriented vibrating fluidized bed reactor 14.

Vibrating bed reactor 14 is comprised of compartments or stages 14a, 14b, 14c, 14d, and 14e. At the bottom of each of stages 14a through 14e of reactor 14 are mixing zones 16a through 16e, wherein the fluid phase or vapor phase reactants, and any reaction product from a previous stage is introduced prior to passing the vapor phase through a catalyst bed. Above each of mixing zones 16a through 16e lies screens 17a through 17e, upon each of which lies a bed of catalyst. The catalyst is passed in plug flow through stages 14a to 14e, and the catalyst beds in each stage of the reactor 14 are fluidized upon vibration of the reactor 14. Reactor 14 may also be inclined from stage 14a to 14e to aid in the passing of the solid catalyst between stages. The reactor is connected to a vibrating means (not shown), which moves springs 15a, 15b, 15c, and 15d, thereby causing vibration of the reactor. Although five stages, 14a through 14e of reactor 14 are shown, it is contemplated that the number of stages or compartments may vary, as long as at least two stages or compartments are present.

Contained within reactor 14 are partitioning means 18a, 18b, 18c, and 18d, which separate the reactor into compartments 14a through 14e.

The vapor phase reactant, which is fed to mixing zone 16a of stage 14a of reactor 14, passes through screen 17a and through the catalyst bed in stage 14a. The vapor phase travels through stage 14a of reactor 14 and then to line 19a. Line 19a of transports the vapors to mixing zone 16b of stage 14b. The vapor then travels through screen 17b and the catalyst bed in 14b, and then to line 19b. Line 19b transports the vapor to mixing zone 16c of stage 14c. The vapor is then passed through screen 17c and the catalyst bed of stage 14c, and then to line 19c, whereby the vapor is transported to mixing zone 16d of stage 14d. The vapor then passes through screen 17d and the catalyst bed of stage 14d. The vapor then is passed to line 19d and transported to mixing zone 16e of stage 14e. The vapors pass through screen 17e of stage 14e and through the catalyst bed of stage 14e. The vapors, after passing through the catalyst bed, are then withdrawn from reactor 14 through flexible line 20.

The passing of the vapor phase reactant through mixing zones 16a through 16e, screens 17a through 17e, and the catalyst beds of stages 14a through 14e, by means of line 13 and lines 19a through 19d, provides for a flow of the vapor phase reactant in a direction countercurrent to the flow of the solids, which flow from stage 14e to stage 14a of reactor 14. The catalyst in each stage of reactor 14 is a fluidized bed, with the fluidization caused by vibration of the reactor 14. In the embodiment shown, fresh catalyst is added to stage 14e of reactor 14, and the catalyst travels from stage 14e, and through stages 14d, 14c, 14b, and 14a, respectively. Thus the movement of the catalyst from compartment to compartment is countercurrent to that of the movement of the vapor phase, although it contemplated that the catalyst and vapor phase may move cocurrently from compartment to compartment.

As the vapor phase is passed through stages 14a through 14e, the vapor phase is converted to a desired product, as it is passed through the fluidized beds of moving catalyst, which moves from stage 14e, through stages 14d, 14c, 14b, and 14a. As the catalyst is passed through these stages, it becomes inactivated, and may be withdrawn from reactor 14, and reactivated as hereinbelow described.

It is to be understood that the fluidization of the catalyst beds of the catalyst beds in stages 14a through 14e of reactor 14 is caused by the vibration of the reactor 14 by a vibrating means, and is independent of the velocity of the vapor phase passing over the catalyst beds 14a through 14e. Thus, one may pass the vapor or fluid phase over the fluidized catalyst beds for a time sufficient to effect reaction or conversion of essentially the fluid phase reactant or reactants, thus minimizing or eliminating the necessity of recycling fluid phase reactants.

Although the embodiment shown depicts reactant being introduced into stage 14a and product withdrawn from stage 14e, it is also contemplated that the reactant or reactants may be added to each of stages 14a through 14e. It is also contemplated within the scope of the present invention that product may be recovered from each of stages 14a through 14e and that the remaining unreacted fluid phase portion be returned to the next successive stage or compartment.

The vapor phase, after being passed through the catalyst beds in stages 14a through 14e, is withdrawn as a desired vapor phase product through flexible line 20. Flexible line 20 is designed so as to absorb the shock of the vibration of reactor 14. The vapor phase product is then passed through line 21 to condenser 22, whereby the vapor product is condensed, and then withdrawn through line 23. The condensed vapors are then passed to separator 24, whereby liquid effluent product is recovered through line 25. Any remaining gases are withdrawn through line 27, and passed through compressor 27 to line 11, whereby the gases are fed along with a fresh feedstock to preheater 12. A portion of these gases may be shunted to gas bypass line 28 so as to avoid an excessive gas pressure in preheater 12, line 13, and reactor 14. The gas in line 28 then passes through flexible line 29, and then to catalyst withdrawal line 30.

After the solid catalyst particles have been passed to stage 14a, the catalyst, which has become inactivated as a result of its contact With the vapor phase reactants in stages 14e, 14d, 14c, 14b, and 14a, is withdrawn from reactor 14 through line 30, wherein the catalyst is contacted with gas passed from flexible line 29 as described above. The catalyst and gas are then passed through flexible line 31, line 32, and line 33, and fed to a single stage vertically oriented fluidized bed vessel 37. In fluidized bed vessel 37, the spent catalyst is heated by air which has been fed to preheater 35 through line 34, and withdrawn from preheater 35 through line 36. Preheater 35 is operated at a temperature of from about 150° C. to about 500° C. The heated air in line 36 is fed to fluidized bed vessel 37. The stream of air introduced to fluidized bed vessel 37 as well as any gas which may be in line 33, causes the fluidization of the catalyst particles.

The introduction of heated air from line 36 serves to reactivate the spent catalyst in fluidized bed vessel 37. The catalyst remains in fluidize bed vessel 37 for a period of time of from about 1 sec. to about 30 sec. In addition, fresh catalyst may be introduced to the fluidized bed vessel 37 through line 41. When heated to a temperature and for a time sufficient to reactivate the spent catalyst, the regenerated catalyst and fresh catalyst are withdrawn from the fluidized bed vessel 37 through line 38, passed through flexible line 39, and introduced into stage 14e of vibrating fluidized bed reactor 14, through line 40, wherein the catalyst will be contacted with a fluid phase reactant, and be passed along stages 14e, 14d, 14c, 14b, and 14a of reactor 14.

Air and other gases within fluidized bed vessel 37 may be withdrawn from vessel 37 through line 42. Line 42 may also contain a small portion of catalyst. The gas in line 42 is passed to cyclone 44. Catalyst fines are recovered from cyclone 44 through line 45, and the gas is withdrawn from cyclone 44 through line 46, and passed through pump 47. A portion of the gas is vented through line 48, and another portion may be passed to line 33 where it joins spent catalyst passed from line 32, and is returned to fluidized bed vessel 37.

In FIG. 2 is depicted an embodiment wherein oxygen is fed to each stage of a multi-stage vibrating fluidized bed reactor for carrying out an oxidation reaction. A fluid phase feedstock, which may be a liquid or vapor phase, in line 110 is heated in preheater 112, and passed to line 113. The feedstock then is admixed with air or oxygen in flexible line 109, said air or oxygen being passed to flexible line 109 from line 108. The feed, as well as the air or oxygen, is then introduced to distributor 116a of stage 114a of reactor 114. Reactor 114 is a multi-stage vibrating fluidized bed reactor, comprised of stages 114a through 114d. Although four stages, 114a through 114d of reactor 114 are shown, it is contemplated that reactor 114 may contain any number of stages, as long as at least two stages are present.

Reactor 114 also includes mixing zones 116a through 116d, constructed as hereinabove described for mixing zones 16a through 16e in FIG. 1, and screens 117a through 117d. A catalyst bed lies above each of screens 117a through 117d. Partitions 118a through 118c divide the reactor into stages 114a through 114d. Also attached to reactor 114 are springs 115a and 115b, which are connected to a vibrating means (not shown).

The catalyst beds in each of stages 114a through 114d are fluidized beds. The fluidization of the beds is caused by the vibration of the reactor 114 by the vibrating means. In the embodiment shown, the catalyst moves from stage 114d to stage 114a, or countercurrent to the movement of the fluid phase reactants.

The feedstock and the air or oxygen, introduced into mixing zone 116a, passes through screen 117a and through the catalyst bed in stage 114a. The reactants, plus any product which may be formed, are then passed to line 119a, which transports the fluid, or vapor phase to mixing zone 116b. The fluid, or vapor phase, therefore is passed through lines 119a, 119b, and 119c, and through mixing zones 116a through 116d and stages 114a through 114d so as to achieve a flow of the fluid, or vapor phase which is countercurrent to the flow of the catalyst.

Make-up oxygen in line 101 is passed to flexible line 102, and then to line 103. The make-up oxygen is then passed to line 103a, whereby the oxygen is combined with fluid phase reactants and/or product in line 119a, to line 103b, whereby the oxygen is passed to a fluid phase in line 119b, and to line 103c, whereby the oxygen is passed to a fluid phase in line 119c. In this way, make-up oxygen is added, along with fluid phase reactants and/or product, to each of mixing zones 116b, 116c, and 116d, thus enabling make-up oxygen to be fed to each of stages 114b through 114d, which enables one to maintain a desired concentration of oxygen in each of the stages of reactor 114.

Product in stage 114d of reactor 114 is withdrawn through flexible line 120, and passed through line 121 to condenser 122. The effluent is then passed through line 123 to vapor-liquid separator 124. A liquid effluent product is recovered through line 125, while vapors are withdrawn through line 126. A portion of the vapors is vented through line 128, while the rest of the vapors are passed through compressor 127 and line 129, to be joined with fresh feedstock in line 113.

The catalyst, which has been passed from stages 114d to 114a, becomes inactivated as it has been passed countercurrently to the movement of the fluid phase reactants. Spent catalyst in stage 114a is withdrawn through lines 130 and 131 and passed to a catalyst regeneration zone (not shown). The catalyst may be regenerated as hereinabove described.

Referring now to FIG. 3, which depicts a co-polymerization of propylene with ethylene or butylene, a gaseous or vapor phase stream of propylene is passed through line 210, combined with recycle propylene and/or ethylene or butylene in line 237, and then passed through line 211, flexible line 212, and line 213, to mixing zone 216 of multistage vibrating fluidized bed reactor 214. Mixing zone 216 serves to distribute the fresh or recycle propylene, as well as fresh or recycle ethylene or butylene, evenly under the catalyst beds in each of stages 214a through 214d of reactor 214. A solid catalyst dispersed in a liquid is also introduced into stage 214a of reactor 214 from line 220, flexible line 221, and line 222. As the dispersion is introduced, the liquid evaporates and the solid catalyst is deposited upon the growing particles of solid polymer lying upon screen 217a in stage 214a. The catalyst is then passed through stages 214a through 214d through vibration of reactor 214.

Multistage vibrating fluidized bed reactor 214 is comprised of stages 214a, 214b, 214c, and 214d, and is disposed at an incline so as to aid in the flow of solid polymer product, containing the trace amount of catalyst, from stage 214a to stage 214d. Reactor 214 is operated under polymerization conditions as hereinabove described. The reactor is also connected to a vibrating means (not shown), which moves springs 215a and 215b, thereby causing vibration of the reactor. Although four stages 214a through 214d of the reactor are shown, the number of stages or compartments may vary as long as at least two stages or compartments are present.

Contained within reactor 214 are partitioning means 218a, 218b, and 218c, which separate the reactor 214 into the stages or compartments 214a, 214b, 214c, and 214d. A mixing zone 216 is located at the bottom of reactor 214. Located above distributor 216 are screens 217a through 217d, upon each of which lies a bed of polymer particles, or beads, containing the catalyst. The polymer particles, formed by the vapor phase polymerization of olefins (ethylene, propylene, 1-butene, etc.) on the surface of the catalyst particles, which are continuously growing, as the polymerization reaction takes place. Attached to reactor 214 are springs 215a and 215b, which are attached to a vibrating means (not shown), which causes vibration of the reactor and fluidization of the solids in stages 214a through 214d. Also disposed across the width of reactor 214 are baffles 219a, 219b, and 219c. As the reactor 214 is vibrated, the solids travel from stage 214a, over baffle 219a, through stage 214b, over baffle 219b, through stage 214c, over baffle 219c through stage 214d. As the solids are passed over baffles 219a, 219b, and 219c, the flowing solids between baffles 219a, 219b, and 219c and partitions 218a, 218b, and 218c, provides for a seal of each of stages 214 through 214d, which prevents the passage of reactant gases between stages of reactor 214.

Mixing zone 216 enables the propylene, plus any recycle ethylene or butylene, to be distributed evenly below each of stages 214a through 214d of reactor 214. The propylene plus the recycle gases is thus simultaneously introduced through screens 217a through 217d, and through the catalyst beds in stages 214a through 214d.

Fresh ethylene or butylene vapors in line 223 are also passed through flexible line 224, and into lines 225a, 225b, and 225c, and are then passed to mixing zone 216. Line 225a is aligned under the solids bed of stage 214b, line 225b is aligned under the solids bed in stage 214c, and line 225c is aligned under the solids bed of stage 214d. The introduction of fresh butylene or ethylene from lines 215a, 215b, and 215c into mixing zone 216 thus enables for an even distribution of ethylene or butylene under the solids beds of stages 214a through 214d. As the ethylene or butylene, and the propylene, come into contact with each other in each of the separate stages 214a through 214d in reactor 214 in the presence of the catalyst, a solid copolymer of propylene with ethylene or butylene begins to form. As the solid copolymer product is formed, it is deposited in the catalyst beds of each of stages 214a through 214d of reactor 214, and is passed from stage to stage of reactor 214, along with the catalyst. The amount of solid copolymer product increases as the solids are passed through the stages 214a through 214d of reactor 214, and as propylene and ethylene or butylene are reacted separately in each stage so as to form the solid copolymer.

As stated above, the movement of catalyst and/or solid polymer product over baffles 219a through 219c, as the solids are passed from stages 214a through 214d, seals each of stages 214a thorugh 214d such that no gaseous reactants are passed between the stages 214a through 214d. Thus, there is provided a cross-current flow of the propylene and ethylene or butylene vapors against the movement of the solids in each of stages 214a though 214d.

It is also to be understood that the catalyst beds in stages 214a through 214d of reactor 214 are fluidized by the vibration of a vibrating means, and that the fluidization of the catalyst beds, as well as the solid polymer which becomes admixed with the catalyst as the reaction progresses, is independent of the velocity of the propylene and butylene or ethylene vapors which pass over the catalyst beds in stages 214a through 214d. Thus, the propylene and ethylene or butylene vapors may be passed over the fluidized catalyst beds for a time sufficient to effect reaction of the propylene with the ethylene or butylene to form a copolymer. This minimizes the amount of vapors which need to be recycled to the multistage vibrating fluidized bed reactor 214.

The solid copolymer product, upon being deposited in or passed to stage 214d, is withdrawn along with the solid catalyst from stage 214d of reactor 214 through line 230. A stream of inert gas is also passed to line 230 from line 238 and flexible line 239. Because, as hereinabove stated, a small amount of polymerization catalyst is necessary in such a polymerization process, it is not necessary to separate the solid polymer from the catalyst, nor is it necessary to regenerate such a small amount of catalyst. The solid polymer in line 230 is then passed through flexible line 231 and recovered through line 232.

Unreacted propylene and/or ethylene or butylene vapors, in each of stages 214a through 214d are withdrawn separately from stages 214a, 214b, 214c, and 214d of reactor 214 through lines 226a, 226b, 226c, and 226d respectively. The unreacted vapors in lines 226a through 226d are passed to line 227, and then passed through flexible line 228 and line 229. The unreacted vapors are then passed through compressor 233. A portion of the unreacted vapor phase is vented through line 235, whereas another portion is passed through line 234 through cooler 236, and line 237. The cooled vapors are combined with fresh propylene from line 210 in line 211, whereby the vapors are fed to mixing zone 216 of reactor 214.

Advantages of the present invention include the ability to effect fluidization of the solid catalyst beds independently of the flow rate or velocity of the fluid phase which is passed over the catalyst beds. This enables one to keep the reactant or reactants in contact with the solid catalyst particles for a period of time sufficient to effect a conversion of reactants to a desired product and minimizing the amount of reactants which need to be recycled. The partitioning of the reactor into at least two stages enables one, if desired, to add a portion of one or more reactants to each stage. This also increases the chances of reacting all of the reactant feed and minimizes the amount of feed that is recycled to the reactor. The staging of the reactor, whereby a portion of one or more reactants is added to each stage, allows the adjustment of the ratio of reactants or comonomers for each stage independently, thereby achieving the optimum concentration profile (as desired, depending on the nature of the reaction) throughout the multistage reactor. It is particularly advantageous when employed in conjunction with highly exothermic reactions which have an unstable product or intermediate, and wherewin the intermediate is the desired product. The addition of a portion of one or more reactants to each stage enables one to increase the selectivity of the reaction for a desired product.

It is to be understood that the scope of the present invention is not to be limited to the specific embodiments described above. The invention may be practiced other than as particularly described and still be within the scope of the accompanying claims.

What is claimed is:

1. A process for reacting a gas phase with a solid phase in a multistage fluidized bed vessel including at least first and second compartments, comprising:
   maintaining a fluidized bed of solids of said solid phase in each compartment by vibrating said vessel and passing said gas phase upwardly through the solids in each compartment, and wherein at least a portion of said gas phase is introduced after passage through said first compartment to a second compartment below the fluidized bed in said second compartment; and
   continuously passing solids from one compartment to another compartment in essentially plug flow, said solids in passing from one compartment to another compartment providing a gas seal between said compartments to prevent the passage of said gas phase between said compartments.

2. The process of claim 1 wherein said vessel includes at least one vertical baffle, said at least one vertical baffle dividing said vessel into at least two compartments and extending downwardly from the top of said vessel and spaced from the bottom of said vessel, thereby providing for at least one space between said at least one vertical baffle and the bottom of said vessel and passing solids from one compartment to another compartment through said space.

3. The process of claim 1 wherein said gas phase moves through each compartment counter-currently with the direction of movement of said solids.

4. The process of claim 1 wherein said solid phase is comprised of a catalyst.

5. The process of claim 4 wherein said solid phase further comprises a solid reaction product.

* * * * *